United States Patent [19]

Yamaguchi et al.

[11] Patent Number: 4,932,244

[45] Date of Patent: Jun. 12, 1990

[54] DISPLAY DEVICE FOR AN ENGINE-EQUIPPED MACHINE

[75] Inventors: Yoichi Yamaguchi, Akashi; Tetsuzo Fujikawa, Kobe; Akira Takahashi, Akashi, all of Japan

[73] Assignee: Kawasaki Jukogyo Kabushiki Kaisha, Kobe, Japan

[21] Appl. No.: 320,152

[22] Filed: Mar. 7, 1989

[30] Foreign Application Priority Data

Mar. 9, 1988 [JP] Japan .................................. 63-55826

[51] Int. Cl.⁵ .......................................... G01M 15/00
[52] U.S. Cl. ................................... 73/117.3; 340/462
[58] Field of Search ............... 73/117.3; 340/459, 462; 364/431.01

[56] References Cited

U.S. PATENT DOCUMENTS

| | | | |
|---|---|---|---|
| 3,893,108 | 7/1975 | McBride, Jr. et al. | 340/459 X |
| 3,964,302 | 6/1976 | Gordon et al. | 73/117.3 |
| 4,344,136 | 8/1982 | Panik | 340/459 X |
| 4,464,933 | 8/1984 | Santis | 340/462 X |
| 4,747,301 | 5/1988 | Bellanger | 73/117.3 |

FOREIGN PATENT DOCUMENTS 62-32335 7/1987 Japan .
62-35861 9/1987 Japan .

Primary Examiner—Jerry W. Myracle
Attorney, Agent, or Firm—Marshall, O'Toole, Gerstein, Murray & Bicknell

[57] ABSTRACT

A display and control for use with an engine-equipped machine apparatus comprising a computer adapted to receive operating information from the apparatus, a memory connected to the computer and operable to store reference values of the operating information, a display connected to the computer for displaying in human readable form a selected operating information and the reference value associated therewith, a control connected to the computer for changing the operating information and the reference value associated therewith to be shown by the display, and an adjustment connected to the computer and the memory for varying the reference values.

7 Claims, 2 Drawing Sheets

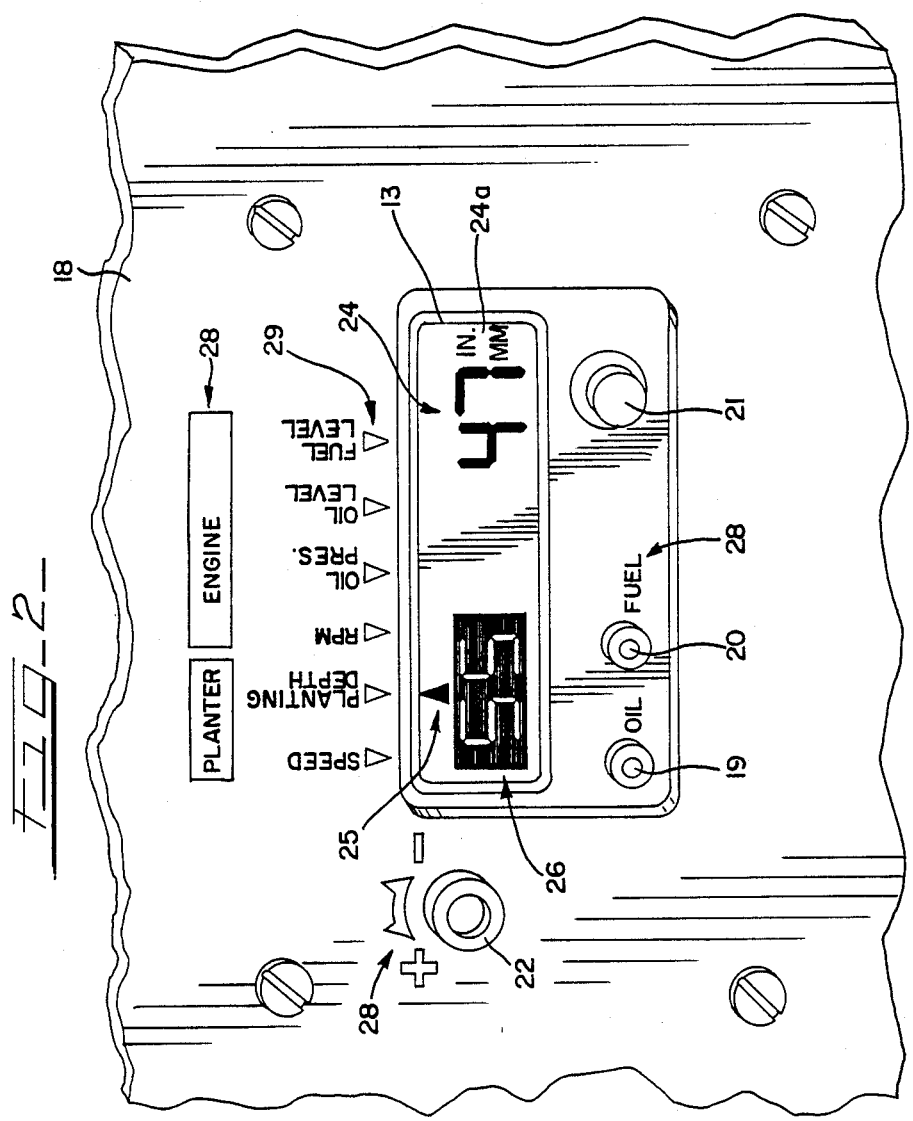

DISPLAY DEVICE FOR AN ENGINE-EQUIPPED MACHINE

FIELD AND BACKGROUND OF THE INVENTION

This invention relates to a control and display device for an engine-equipped machine such as a rice-planting machine, cultivator, compressor, etc.

Prior art control and display devices include devices such as that described in Japanese Patent Publication Sho. No. 62-32335 in which a pushbutton is used to selectively display the AC voltage, the alternating current, or the frequency of the output of an electrical generator. In addition, there are devices such as that described in Japanese Utility Model Publication Sho. 62-35861 wherein a problem warning indication and the normal information are alternately flashed on and off in the event of a minor problem, and only the problem warning indication flashes on and off in the event of a major problem, etc.

With the above-described types of devices, because the reference values for the various types of information are not displayed, it is not possible to know whether or not the displayed information matches the reference values or how large the difference is if they do not match, thus inhibiting the execution of the work being performed or making it difficult to confirm whether or not the work is being performed correctly.

SUMMARY OF THE INVENTION

The foregoing described problems are avoided by providing a control and display device for an engine-equipped machine in accordance with this invention wherein, in addition to being provided with a control device for converting various information concerning the engine and the machine driven by the engine into numerical values based on the detection signals from various sensors installed on the engine and the machine, and storing in a memory a reference value for each type of the detected information, there is also provided a display device for showing alphanumeric characters and other symbols, a control for changing the display mode, and a control for adjusting the reference values, which are connected to the control device. The display simultaneously shows one type of information concerning the engine and the machine, the type of the information being shown, and the reference value for the information. The output of the control device and the type of information displayed in the display are selected by the operation of the control for changing the display mode, and both the reference values displayed in the display and the reference values stored in the memory of the control device may be changed by the operation of the control for adjusting the reference values.

Thus, one type of information concerning the engine and machine, the type of that information, and the reference value for that information are simultaneously displayed in the display as alphanumeric characters and as other human readable symbols. By operating the control for changing the display mode, the output of the control device and the type of information displayed in the display are selected. By operating the control for adjusting the reference values, both the reference values displayed in the display and the reference values stored in the memory of the control device may be changed.

BRIEF DESCRIPTION OF THE DRAWINGS

The invention may be better understood from the following detailed description taken in conjunction with the accompanying figures of the drawings, wherein:

FIG. 2 shows a perspective view of an external display of the display and control of the display device.

DETAILED DESCRIPTION OF THE DRAWINGS

Figure 1:
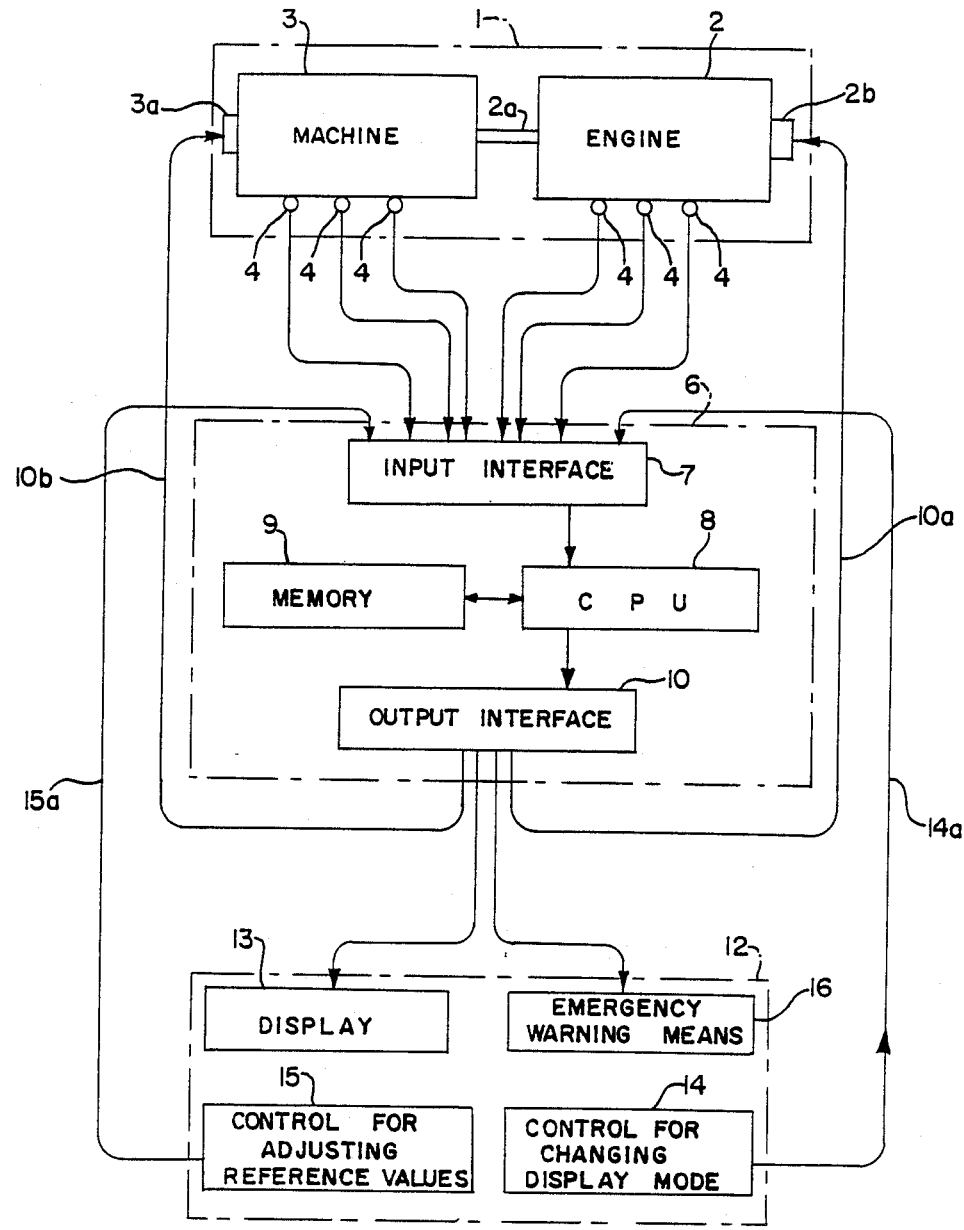
FIG. 1 shows a block diagram of apparatus including a control and display device for an engine-equipped machine in accordance with a specific example of this invention.

In FIG. 1, an engine-equipped apparatus 1 includes an engine 2 (such as an internal combustion engine) and a machine 3 driven by the engine, such as a rice-planting machine, the engine and the machine being connected by a coupling 2A. A plurality of sensors 4 are coupled to the engine 2 and to the machine 3, and these sensors 4 detect such information as the rotational speed, the oil pressure, the oil level, the fuel level, etc., of the engine 2, and such as the traveling speed, the planting depth, etc. of the machine 3. The construction of the engine 2, the machine 3 and the sensors 4, and the interconnections of these components may all be conventional.

A control device comprising, for example, a microcomputer, etc., is shown in the dash-dot block 6 and comprises an input interface 7 into which the detection signals from the sensors 4 are fed, a CPU (central processing unit) 8 into which the signals from the input interface 7 are fed, a memory 9 comprising a RAM or a ROM, etc., and an output interface 10 which outputs the signals from the CPU 8. In addition to computing and processing the signals from the sensors 4, supplying throttle control signals, stop signals, etc., to the engine 2, and supplying planting depth adjustment signals, etc. to the planting depth adjustment mechanism (not illustrated) of the machine 3, the CPU 8 also supplies display signals to a display device which will be described in more detail hereinafter.

In a conventional manner, the program needed for operation of the CPU 8, the reference values, etc., are stored in the memory 9. These reference values are predetermined and preset values of the information or operational modes, such as the optimum engine rotational speed, the minimum necessary oil pressure, the minimum necessary oil level, the minimum necessary fuel level, etc. of the engine 2, and the optimum traveling speed, the optimum planting depth, etc., of the machine 3.

A display device for displaying the various information, etc. in human readable form, detected by the sensors 4 and for adjusting the reference values is shown in a dash-dot line block 12 comprising a display 13 including, for example, an LCD display, etc., a control 14 for changing the display mode composed of, for example, a pushbutton switch, etc., for selecting the contents of the display 13, a control 15 for adjusting the reference values comprising, for example, a variable resistor, etc., for changing the reference values, and an emergency warning means 16 comprising, for example, light-emitting diodes, etc., for warning that the oil level, fuel level, etc., is insufficient.

The display 13 is driven by the display signals received from the control device 6. It digitally displays one type of information concerning the engine 2 and the machine 3 as detected by the sensors 4, and it also displays an indication mark, which will be described later, to indicate the type of information being displayed. The display 13 also digitally displays the reference value which corresponds to the information being displayed and which is stored in the memory 9. Signals from the control 14 are operable to adjust the CPU to show a different display.

These indications of the display 13 are displayed simultaneously, and, by operating the control 15 for adjusting the reference values, the reference value being displayed may be changed, and the reference value stored in the memory 9 is also changed. The display contents of the display 13 may be selectively switched to another type of information by operating the control 14 for changing the display mode as previously mentioned. The emergency warning means 16 is driven by the control device 6 when the oil level, fuel level, etc. becomes insufficient, as mentioned.

In FIG. 2, the display 13, the light-emitting diodes 19 and 20 for the oil pressure and the fuel level, which constitute the emergency warning means 16, and the pushbutton 21 of the control 14 for changing the display mode are mounted in a cutout section of a panel 18. The knob 22 of the control 15 for adjusting the reference values protrudes from the surface of the panel 18. The panel 18 may be part of a cabinet which contains the electrical components of the devices 6 and 12.

In the display 13, the actual planting depth of the machine 3 as detected by one of the sensors 4 is digitally displayed as the information display 24 and the units (such as millimeters or inches) for that information is also displayed as characters 24A. In addition, a movable indication marker 25 which indicates that the display currently shown (such as the planting depth of the machine 3) is formed by a triangular symbol, and the reference value for the planting depth is also simultaneously digitally displayed as the reference value display 26.

Various characters 28 indicating the different types of information, etc. available to be shown and a triangular indicator 29 for each type, which is pointed to by the movable indicating marker 25 of the display 13 in order to clearly identify the types of information are, for example, printed on seals or labels and attached to the surface of the panel 18.

It is acceptable for the control device 6 and the display device 12 to be mounted directly on the engine-equipped apparatus or machine 1. On the other hand it is also acceptable to connect either the display device 12 alone, or both the display device 12 and the control device 6 to the engine-equipped machine 1 via a cable, thus making remote operation possible.

The foregoing example of the invention operates as follows. Various types of information, such as the rotational speed, oil pressure, oil level, fuel level, etc., of the engine 2, and the traveling speed, planting depth, etc., of the machine 3 are detected by the sensors 4, and the detected signals of the sensors 4 are fed to the CPU 8 via the input interface 7. The information from the sensors 4 may include types of information which change constantly in accordance with the ambient environment, and it may also include types of information which are not subject to very sudden change, depending on the properties inherent to the type of information. For example, the engine speed may change quickly but the planting depth may not. The CPU 8 converts the various information into numerical values based on the detection signals from the sensors 4, and, at the same time, reads the reference value for each type of information from the memory 9 and outputs control signals through the output interface 10 to the engine 2 and the machine 3 via lines 10A and 10B to adjustment mechanisms 2B and 3A so that the rotational speed, etc. of the engine 2 or the traveling speed, the planting depth, etc. of the machine 3 may be adjusted to match the reference values stored in the memory 9 and shown in the display 13. For example, the mechanism 2B may function to adjust the engine throttle setting, and the mechanism 3A may function to adjust the machine planting depth setting.

If the oil level, fuel level, etc. of the engine 2 drops below the reference value, the CPU 8 outputs a warning signal to the emergency warning means 16 via the output interface 10 in order to drive the LED 19 or 20. In the event of a low oil level or engine overheating, the CPU 8 and the interface 10 also output a stop signal to the engine 2 via the line 10A in order to stop the engine 2. Furthermore, the CPU 8 outputs display signals indicating one of the various types of numerically converted information, the type of the information being displayed using the marker 25, and the reference value for that information which was read from the memory 9 and fed to the display 13 via the output interface 10, thus driving the display 13. In this way, as shown in FIG. 2, the display 13 displays the information display 24, the indication marker 25, and the reference value display 26.

By pressing the pushbutton 21, a switching signal is supplied from the control 14 via a line 14A for changing the display mode to the CPU 8 via the input interface 7, and this causes the CPU 8 to change the type of information being fed to the display 13. Thus, the display contents of the display 13 change, and, for example, the information for the rotational speed of the engine 2 is displayed. At this time, the indicating marker 25, of course, moves to the position indicating the indicator 29 corresponding to the rotational speed. In this way, the information displayed in the display 13 is consecutively switched each time the pushbutton 21 is pressed.

When the knob 22 is turned, the signal supplied from the control 15 for adjusting the reference values to the CPU 8 via the line 15A and the input interface 7 changes, and the CPU 8 changes the reference value being displayed in the display 13 accordingly, and, at the same time, also changes the reference value stored in the memory 9. The reference value is changed for the specific type of information currently being displayed, when the knob 22 is turned. The CPU 8 then compares the changed reference value and the detection signal from the sensor 4 and outputs control signals to the engine 2 and machine 3 via the output interface 10 and the lines 10A and 10B and the mechanisms 2B and 3A in order to adjust or modify the operation of the engine and/or the machine until the detection signal comes to match the changed reference value. Of course, because only the reference value stored in the memory 9 which is changed by the operation of the knob 22 is the one which corresponds to the information being displayed at that time in the display 13, in order to change the reference values for more than one type of information, it is necessary to operate the pushbutton 21 in order to consecutively display each type of information in the display 13 and then operate the knob 22 for each one.

In this way, because both the actual or detected value and the reference value for each consecutive type of information can be simultaneously displayed in the display 13, by looking at the display 13, it can be easily confirmed whether or not the control or adjustment is being properly executed. In addition, because the reference values can be changed by operating the knob 22 while observing the reference value being digitally displayed in the display 13, optimum control or adjustment in accordance with the work condition, etc. can be easily accomplished.

Although the type of information is indicated by the position of the indication marker 25 in the embodiment described above, this invention is not limited to this composition, and it is possible, for example, to display the type of information in the display 13 as characters.

Although warning indications are accomplished by the light-emitting diodes 19 and 20 in the embodiment described above, this invention is not limited to this composition, and it is possible, for example, to provide an audible warning using a buzzer, etc., or to display the warning in the display 13 as characters. Furthermore, the type of warning, such as low oil level, overheating, etc. can be other types and selected as needed.

Although the engine 2 and machine 3 are controlled automatically by the CPU 8 in the embodiment described above, this invention is not limited to this composition, and it is possible to have manual operation of the engine 2 and machine 3 while observing the display 13. In this case, because the detection value and the reference value are both displayed in the display 13 at the same time, optimum control or adjustment can be easily achieved by manually operating the engine 2 and machine 3 while observing the display 13.

Although the explanation of the embodiment described above concerns a rice-planting machine, this invention is not limited to this composition, and it is possible for the machine 3 to be, for example, a cultivator, combine, pump, compressor, lawn mower, etc. In this case, the operational mode or information of the machine 3 detected by the sensors 4 and displayed in the display 13 is changed as appropriate to rotational speed, cutting height, discharge pressure, etc. Furthermore, the information of the engine 2 detected by the sensors 4 and shown by the display 13, such as the water temperature, oil temperature, water pressure, water level, throttle opening, fuel injection amount, fuel consumption amount, fuel consumption rate, output power, etc. can also be selected as needed.

Because the invention described herein is a control and display device for an engine-equipped machine constructed in such a manner that, in addition to being provided with a control device which converts various information concerning the engine and the machine into numerical values based on the detection signals from various sensors installed on the engine and the machine and which has stored in its memory a reference value for each type of that information, it is also provided with a display device which has a display for displaying alpha-numeric characters or other symbols, a control for changing the display mode, and a control for adjusting the reference values and which is connected to the control device. The display simultaneously displays one type of information concerning the engine and machine, the type of that information, and the reference value for that information. The output of the control device and the type of information displayed in the display are selected by the operation of the control for changing the display mode, and both the reference values displayed in the display and the reference values stored in the memory of the control device may be changed by the operation of the control for adjusting the reference values. Because the detection value and the reference value for each type of information can both be displayed in the display at the same time, during automatic control it can be easily confirmed whether or not control or adjustment is being properly executed by observing the display means, and during manual operation, optimum control or adjustment can be easily achieved by manually operating the engine and machine while observing the display means. In addition, because the reference values can be changed while observing the reference value being digitally displayed in the display by operating the control for adjusting the reference values, optimum control or adjustment in accordance with the work conditions, etc. can be easily accomplished.

What is claimed is:

1. A control and display device for apparatus including a machine and an engine for driving the machine, said engine and said machine having a plurality of sensors connected thereto for sensing information, said device comprising a control adapted to be connected to said sensors for converting various information concerning the engine and the machine into numerical values based on the detection signals from said sensors, said control including a memory for storing a reference value for each type of said information, said device further comprising a display connected to said control for displaying alphanumeric characters or other symbols, first means for changing the display mode from one type of information to a different type, second means for adjusting the reference values in said memory, said display simultaneously displaying one type of information concerning said engine and machine, the type of that information, and the reference value for that information, the output of said control and the type of information displayed in said display being selected by the operation of said first means for changing the display mode, and both the reference values displayed in said display and stored in said memory being changed by the operation of said second means for adjusting the reference values.

2. Apparatus for use with a machine and an engine connected to drive the machine, said engine and said machine each having at least one operational mode, and a plurality of sensors connected to said engine and to said machine for sensing actual values of each of said operational modes, said apparatus comprising a control adapted to be connected to and receive information from said sensors, said control including a memory for storing reference values for each of said operational modes, and computing means for converting said information from said sensors into human readable symbols, said apparatus further comprising display means including first, second and third displays connected to said control, said first display showing an actual value of a selected operational mode in readable symbols, said second display showing a reference value of said selected operational mode in said readable symbols, and said third display identifying said operational mode, said apparatus further comprising first adjustment means for changing said first, second and third displays from one operational mode to another operational mode, and second adjustment means for changing said reference values.

3. Apparatus as set forth in claim 2, wherein said second adjustment means is operable to change said reference value of the operational mode being shown by said displays.

4. Apparatus as set forth in claim 2, and further including at least one adjustment means connected to said computing means and adapted to be attached to one of said engine and said machine for adjusting an operational mode, said computing means causing said adjustment means to adjust the actual value to said reference value of said operational mode.

5. A display and control for use with an engine-equipped machine apparatus comprising:
   (a) computing means adapted to receive operating information from said apparatus,
   (b) memory means connected to said computing means and operable to store reference values of said operating information,
   (c) display means connected to said computing means for displaying in human readable form a selected operating information and the reference value associated therewith,
   (d) control means connected to said computing means for changing the operating information and the reference value associated therewith to be shown by said display means, and
   (e) adjustment means connected to said computing means and said memory means for varying said reference values.

6. A display and control as set forth in claim 5, wherein said adjustment means varies the reference value being currently shown by said display means.

7. A display and control as set forth in claim 5, and further including means connected to said computing means and adapted to be connected to said apparatus for making an operating information correspond to the reference value associated therewith.

* * * * *